Feb. 2, 1937.  T. SKAJAA  2,069,483
DUST SEPARATOR
Filed Sept. 18, 1935
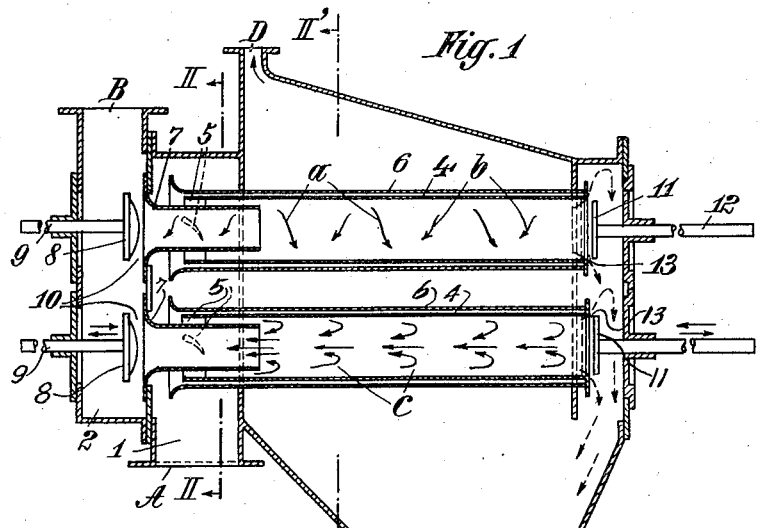
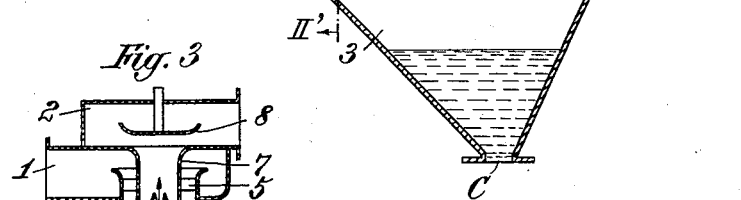
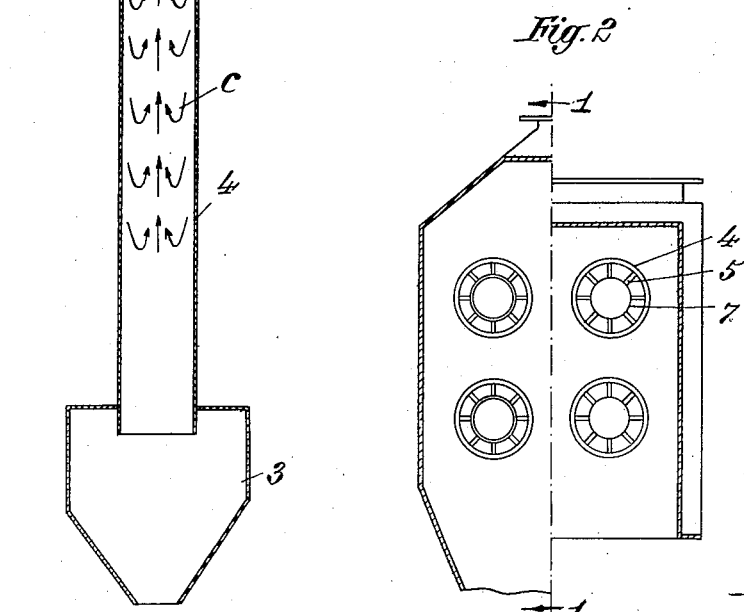
Inventor:
Talir Skajaa Patented Feb. 2, 1937

2,069,483

UNITED STATES PATENT OFFICE 2,069,483

DUST SEPARATOR

Torleiv Skajaa, Kristiansands, Norway, assignor to Det norske Aktieselskab for Elektrokemisk Industri, Oslo, Norway Application September 18, 1935, Serial No. 41,061

5 Claims. (Cl. 183—39)

The invention has for its object apparatus for the treatment of gases or vapors for the purpose of removing therefrom dust or the like by means of cyclonic or whirling action on the gases or vapors under treatment.

The principal object of the invention is the creation of a simple and practical cyclone or whirl-forming apparatus which at a minimum power consumption in an effective way may serve for separation and collection of particles of small size.

The invention concerns apparatus of the type where the gases to be treated are led through a common intake chamber into one or more whirl-forming separating elements (commonly of tubular form having a circular cross section) which at the inlet end are provided with guiding vanes or the like which give the gas a whirling movement in the separating elements, in which at the same time the gas is given a longitudinal movement relative to the axis of the whirl. In such apparatus the dust particles even of small size under the action of the centrifugal force are thrown out of the gas current onto the inner walls of the separating element and are carried around these walls in a helical path through the separating element to a dust collecting chamber at the dust outlet end thereof. The inner layers of this whirlwind are gradually drawn toward the axis of the separating element and form an inner whirling body of gas whose axial movement is opposite to that of the outer whirling body. The inner whirl carries the gases freed from dust toward a gas outlet pipe usually centrally arranged at the inlet or outlet end of the separating element and leading into a purified gas collection chamber.

When a body of gas rotates as is the case in above mentioned separating elements there will be the following velocity and pressure conditions: The velocity will be lowest at the greatest distance from the axis of rotation, and highest near the axis of rotation so that the product of velocity and radius will be approximately constant; at the same time the pressure will be lowest where the velocity is highest, that is near the axis of the whirl.

By reason of these phenomena, in the known apparatus of above mentioned kind where an outlet for dust with circular cross section is arranged at one end of the apparatus and for purified gas at the other end of the apparatus, there will at each of these outlets take place a suction, drawing back gas from respectively the dust chamber and the collecting chamber for gas to the central parts of the separating element.

These gases drawn back by suction have little or no speed of rotation and must be caused to rotate by the gas rotating in the tube, whereby a considerable part of their kinetic energy is consumed. At the same time this suction will cause formation of secondary whirls disturbing the action of the apparatus and consuming energy.

One of the objects of the present invention is to improve apparatus of the above mentioned type by preventing the said suction of gas from the dust collecting chamber or from the gas collecting chamber or both into the central parts of the whirling body of gas in the separating element. With this end in view and in accordance with this invention the improved apparatus for separating dust from gases comprises a cylindrical separating element, means at the inlet thereof to give the dust laden gas a whirling helical movement, a cylindrical outlet element for purified gas extending axially into the separator element and having its intake end terminating beyond the said means and its exhaust end terminating outside of and beyond the inlet of the separator element, means positioned at the exhaust end of the outlet element and means at the exhaust end of the separator element cooperating with said last mentioned means to prevent a reverse flow of gas through the outlet element during the operation of the separator.

In accordance with one form of the invention the desired results are obtained by the proper positioning of baffle plates or valves in relation to the outlet pipe for the purified gas and the dust outlet end of the separating element, as will be more fully hereinafter set forth. In another form of the invention the separator element is elongated at its dust discharge end to such an extent that the baffle plate or valve at the said dust outlet end may be dispensed with.

Further characteristics and advantages of the invention will appear from the following description, reference being had to the accompanying drawing which diagrammatically illustrates two preferred forms of the invention.

In the drawing, Figure 1 is a vertical sectional view of one form of apparatus embodying my invention, along the line I—I in Fig. 2;

Fig. 2 is a two-part sectional view of the apparatus illustrated in Fig. 1, to the left of the dot and dash line along the lines II'—II' of Fig. 1, and to the right of the dot and dash line along the line II—II of Fig. 1; and Fig. 3 is a vertical sectional view of a different form of my invention illustrating a single separating element in axial section.

Referring first to the form of dust separator illustrated in Figs. 1 and 2, the separator comprises an intake chamber 1 of suitable size and construction into which the dust laden gas is introduced under pressure through an inlet port A in a manner well known in this art; a gas collecting chamber 2 in convenient proximity to the intake chamber into which the gases are led after removal of the dust particles therefrom, which gas collecting chamber is provided with a suitable outlet port B; a relatively large dust collecting chamber 3 in suitable proximity to the intake chamber, having at the bottom an outlet opening C for the removal of the dust separated from the gas and following into the dust chamber, and at the top a gas outlet port D for the removal of that portion of the purified gas which escapes into the dust chamber; one or more dust separating elements 4 (two being illustrated) suitably mounted with their intake openings positioned in the dust collecting chamber 3; and a purified gas outlet element 7 for each of the dust separating elements, leading from the dust separating elements into the gas collecting chamber 2.

Each separating element 4 is preferably of tubular shape having a cylindrical cross section and is provided at its intake end with a series of curved vanes 5 suitably mounted therein at uniform angles whereby the dust laden gas in passing between the vanes into the tubular chamber of the separating element is given a whirling motion. Each separating element is for convenience removably mounted in a cylindical tube 6 of larger diameter to permit of accessibility of the curved vanes 5 for cleaning, repair and replacement, the exterior mounting tube 6 being rigidly mounted in a suitable manner, one end at the rear of the dust chamber 3 and the other end in intake chamber 1.

The gas outlet element 7 preferably is of tubular construction with a flaring exhaust opening resembling a funnel which serves as a convenient means for mounting on the wall of the gas collecting chamber nearest the intake chamber. The tubular portion of the gas outlet element is of smaller diameter than the separating element 4 and extends axially into the separating element a suitable distance beyond the curved vanes 5 with the inner faces of which it contacts as illustrated in Fig. 2.

Opposite the flaring exhaust mouth of each gas outlet element 7 is a vertically positioned circular plate with rounded face mounted on a rod 9 which is adjustably carried in a suitable journal or bearing mounted on the outside wall of the gas collecting chamber 2, the center of the plate being in the axial line of the gas outlet element. The plate 9 is of a diameter substantially the same as the diameter of the flared opening of the gas outlet element and its positional relation thereto is such as to form an annular opening at the exhaust end of the gas outlet element of the desired size dependent upon the gas being treated and the condition thereof, as will be readily understood by those skilled in the art, the dimensions of the annular opening being adjustable as required by movement of the rod 9 in its journal or bearing.

At the opposite end of each separating element is adjustably mounted a circular plate 11 which is carried on a rod 12 movably mounted in a suitable journal or bearing affixed to the side of the dust collecting chamber. The diameter of the plate 11 is just slightly less than the inside diameter of the separating chamber, and its positional relation thereto is such as to form an annular opening at the dust outlet end of the separator element of the desired size dependent upon the gas being treated and the condition thereof as will be readily understood by those skilled in the art, the dimensions of the annular opening being adjustable as required by movement of the rod 12 in its journal or bearing. The rod 12 is of sufficient length so that the circular plate 11 may be moved within the separator element into contact with the inside end of the gas outlet element 7, the center of the plate in all of the positions lying substantially in the axial line of the separating element.

The apparatus schematically illustrated in Fig. 3 is primarily a design for separators in which the separating element is vertical rather than horizontal as are the separating elements illustrated in Figs. 1 and 2. As with the apparatus of Figs. 1 and 2, a plurality of separating elements may be employed. This apparatus is somewhat simplified but it has the intake chamber 1, the collecting gas chamber 2 for purified gas, the dust collecting chamber 3, the separating element 4 with the curved vanes 5 at its intake end, the gas outlet element 7, and the adjustably mounted circular plate 8, of the construction shown in Figs. 1 and 2 arranged in the relationship of that construction. The circular plate 8 is, however, made of a flat piece with its circumferential edge bent backwardly from the gas outlet 7 to give its face the rounded contour of the corresponding plates in Fig. 1. The plate 8 of Fig. 3 is available for use with the separating element illustrated in Fig. 1 in place of the corresponding plate or plates there shown if desired. The dust outlet end of the separating element 4 of Fig. 3, however, does not have the adjustable plate 11 of Fig. 1, but in lieu thereof the chamber of the separating element 4 is elongated a sufficient amount to diminish greatly the whirling helical movement as it progresses through the separating element and to prevent the intake of gases from its dust exhaust end which is illustrated as rigidly mounted in the dust collecting chamber 3.

The operation of the apparatus illustrated in Figs. 1 and 2 is as follows: On account of the difference in pressure between intake A and outlet B the gas from the intake chamber 1 is drawn past the vanes 5 and thereby acquires a rapidly whirling movement and at the same time passes longitudinally in direction from the inlet ends of the separating elements as indicated by the arrows $a$. The gas thus whirling along the walls of the separating chambers forms an outer whirl in each chamber whose inner parts are gradually drawn towards the axis of the whirl as indicated by the arrows $c$. The gas thus drawn toward the center will keep its whirling movement but will obtain an axial movement in opposite direction as indicated by the arrows $b$. In the interior of each separating chamber an inner gas whirl is thus formed which carries the gas towards its gas outlet element 7. The dust particles originally present in the gas are under the action of the centrifugal force thrown against the walls of the separating elements 4 and are then carried toward the dust outlet ends of the separating elements opposite to the inlet ends by the axial movement of the gas along the separating chamber walls, the path of the dust particles being generally helical along the inner walls of the separating chambers.

In the construction now under consideration the dust particles separated out are carried through the annular slots 13 between the plates 11 and the ends of the tubes 4. The plates 11 will in this case prevent suction of gas from the dust chamber 3 to the central parts of the separating elements which would otherwise take place on account of the lower pressure prevailing near the axis of the whirl. Small quantities of the purified gas will in some cases regardless of the plates 11 pass into the dust chamber 3. This gas is drawn out through the outlet port D. The dust which is settled in the dust collecting chamber 3 is removed from the apparatus through the outlet opening C.

The gas whirls escaping through the outlet elements 7 into the gas collecting chamber 2 are by the action of plates 8 led radially out through the annular slots 10. The pressure in these slots will be the same as in the collecting chamber while the pressure near the axis of the whirl will be considerably lower on account of the previously mentioned aerodynamic conditions.

In case the removal of gas by suction through the outlet D occasions difficulties the plates 11 may each be provided with a central hole. On account of the low pressure near the axes of the separating chambers some gas will then be drawn back into the separating elements 4 but a sufficient current of gas in the annular slots 13 is secured without disturbing effects on the operation of the apparatus by the returning gas.

As above pointed out the plates 11 are so mounted that they may be moved into the separating elements against the inlet ends of the gas outlet elements 7 thereby closing the apparatus. The adjustable mounting of the plates 11 also permits them to be employed for loosening any dust which may adhere to the interior of the dust separating chambers.

By closing one or more of the separating elements 4 as just set forth the apparatus may be so adjusted that a maximum difference in pressure between inlet and outlet may be maintained with varying quantities of gas, thus keeping the apparatus at maximum effect.

While the adjustability of both the plates 8 and 11 makes possible an adjustment of the apparatus to suit different operating conditions, as, for example, different pressure conditions between the intake for dust laden gas and the outlet for purified gas, the plates 8 and 11 are intended to be so positioned in relation to the gas outlet element 7 and the dust separating element 4 as to cooperate in preventing a reverse flow of gas through the outlet element during the operation of the separator.

From the foregoing description of the operation of the apparatus illustrated in Figs. 1 and 2, it is believed that the operation of the apparatus illustrated in Fig. 3 will be understood without any detailed discussion. The functional length of the separating element 4 in cooperation with the plate 8 prevents a reverse flow of gas through the dust exhaust end of the separating element, and the dust separated from the dust laden gas in the separating element falls by its own weight from the separating element into the dust chamber at the bottom, from which it is removed in like manner as in the case of the apparatus illustrated in Figs. 1 and 2. The gas at the lower end of the separating element has practically no axial movement and for this reason the dust collecting chamber 3 is not shown as provided with a gas outlet port.

An important feature of the apparatus according to this invention is the fact that the separating elements may be made considerably longer than in the apparatus previously known. This is caused by the arrangement of the plates 8 and (if used) the plates 11 which prevent the disturbing whirl formations which otherwise take place at the outlet ends of the gas outlet elements 7 and separating elements 4 respectively and cause considerable loss of energy by reduction in velocity. The greater length of the tubes increases the effectiveness of the apparatus as the radial speed-components of the whirl are reduced.

It will be understood that the drawing must be considered purely diagrammatic for illustration of the invention. The foregoing detailed description has been given for clearness of understanding and no undue limitation is to be inferred therefrom, but the appended claims are to be construed as broadly as possible in view of the prior art.

I claim:

1. Apparatus for the separation of dust from gases, comprising a cylindrical separating element, means at the inlet thereof for giving the dust laden gas a whirling helical movement, a cylindrical outlet element for purified gas extending axially into the separating element having its intake end terminating beyond the said means and its exhaust end terminating outside of and beyond the inlet of the separating element, means positioned at the exhaust end of the outlet element and means at the exhaust end of the separating element cooperating with said last named means to prevent a reverse flow of gas through the outlet element during operation of the separator.

2. Apparatus for the separation of dust from gases, comprising a cylindrical separating element, means at the inlet thereof for giving the dust laden gas a whirling helical movement, a cylindrical outlet element for purified gas extending axially into the separating element having its intake end terminating beyond the said means and its exhaust end terminating outside of and beyond the inlet of the separator element, a plate having a convex face positioned at the exhaust end of the outlet element, the separating element being elongated at its exhaust end to such a length that the whirling helical movement of the gas is there greatly diminished, said extended end of the separator element cooperating with the said plate to prevent a reverse flow of gas through the outlet element during operation of the separator.

3. Apparatus for separation of dust from gases comprising a cylindrical separating element, an inlet provided with means for giving the gas a whirling helical movement and a centrally arranged outlet for purified gas extending into the separating element, the dust separated out being removed from the separating element at the end opposite to the inlet, the outlet for purified gas and the discharge for dust being shielded by axially adjustable plates at their outer ends preventing suction of gas into the separating element.

4. Apparatus for separation of dust from gases comprising a cylindrical separating element, an inlet provided with means for giving the gas a whirling helical movement and a centrally arranged outlet for purified gas, the dust separated out being removed from the separating element at the end opposite to the inlet, the discharge for dust being shielded by an axially adjustable plate having a diameter smaller than the internal diameter of the separating element, said plate thus being able to pass into said element.

5. An apparatus for effecting the separation of dust particles from dust laden gas comprising in combination, a tube of substantially circular cross-section, one end of said tube being mounted in a pressure chamber wherein the dust laden gas is contained, the other end of said tube being mounted in the dust collector, diagonal fins mounted in proximity in the inlet end of said tube whereby pressure gas on entering the tube is given a whirling motion at high pressure adjacent the inner walls of said tube and whereby low pressure is maintained centrally of the tube substantially throughout its length, a tube of smaller diameter and shorter length mounted coaxially in the inlet end of the first mentioned tube having its outer end terminating in a gas collector chamber, a valve disposed in the dust collector adjacent the opposite end of said first mentioned tube adapted partially to close the end thereof for regulating the opening at said end of the tube, a second valve disposed in the gas collector chamber adjacent the outlet end of said second mentioned tube and adapted to prevent the suction of gas from said chamber into said first mentioned tube, and means for regulating the position of said valves in respect to the ends of the respective tubes adjacent which they are mounted; the organization of the parts being such that the dust is separated from the dust laden gas within the first mentioned tube and is centrifuged out of the exit end thereof to fall in the dust collector chamber and the gas thus purified returned through the low pressure area axially of the said tube and led into the gas collector chamber through the second mentioned tube.

TORLEIV SKAJAA.